(12) United States Patent
Mueller et al.

(10) Patent No.: US 9,102,314 B2
(45) Date of Patent: Aug. 11, 2015

(54) ONBOARD NETWORK FOR A VEHICLE AND METHOD FOR SAVING ENERGY

(75) Inventors: Wolfgang Mueller, Stuttgart (DE); Christian Prag, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 533 days.

(21) Appl. No.: 13/144,402

(22) PCT Filed: Dec. 17, 2009

(86) PCT No.: PCT/EP2009/067433
§ 371 (c)(1),
(2), (4) Date: Sep. 30, 2011

(87) PCT Pub. No.: WO2010/081611
PCT Pub. Date: Jul. 22, 2010

(65) Prior Publication Data
US 2012/0038318 A1    Feb. 16, 2012

(30) Foreign Application Priority Data
Jan. 14, 2009   (DE) .................. 10 2009 000 222

(51) Int. Cl.
*H02J 7/00*       (2006.01)
*B60W 10/08*   (2006.01)
(Continued)

(52) U.S. Cl.
CPC *B60W 10/08* (2013.01); *B60L 7/16* (2013.01); *B60L 11/005* (2013.01);
(Continued)

(58) Field of Classification Search
USPC .......................................... 320/109
See application file for complete search history.

(56) References Cited

U.S. PATENT DOCUMENTS 6,430,482 B1   8/2002   Wakashiro et al.
6,578,649 B1 *   6/2003   Shimasaki et al. ....... 180/65.225
(Continued)

FOREIGN PATENT DOCUMENTS

DE   19755050   7/1999
DE   10042532 A1   3/2002
(Continued)

OTHER PUBLICATIONS

PCT/EP2009/067433 International Search Report.

*Primary Examiner* — Richard Isla Rodas
*Assistant Examiner* — David V Henze-Gongola
(74) *Attorney, Agent, or Firm* — Michael Best & Friedrich LLP

(57) ABSTRACT

The invention relates to an onboard network (1) for a vehicle (32), in particular a motor vehicle. The onboard network (1) comprises an electric machine (10) designed for operating in generator mode. The onboard network (1) further comprises a voltage transformer (12) that is at least indirectly connected to the electric machine (10) on the input side and a first energy accumulator (14) connected to the voltage transformer (12) on the output side, in particular an accumulator. The electric machine (10) is designed for the recuperation operation. The voltage transformer (12) is designed to detect or limit a charge state of the first energy accumulator (14) and to regulate the charge state of the first energy accumulator (14) such that the first energy accumulator (14) has a reserve capacity (15) during generator operation, preferably when driving the vehicle in an energy-consuming manner. The voltage transformer (12) is further designed to charge the reserve capacity (15) of the first energy accumulator (14) depending on a recuperation signal (23) received on the input side and representing a recuperation operation of the vehicle (32).

7 Claims, 2 Drawing Sheets

(51) Int. Cl.
  *B60L 7/16* (2006.01)
  *B60L 11/00* (2006.01)
  *B60L 11/18* (2006.01)
  *B60W 10/26* (2006.01)
  *B60W 30/18* (2012.01)
  *B60W 20/00* (2006.01)

(52) U.S. Cl.
  CPC ........... *B60L 11/1868* (2013.01); *B60W 10/26* (2013.01); *B60W 30/18127* (2013.01); *B60W 20/00* (2013.01); *B60Y 2200/15* (2013.01); *Y02T 10/7005* (2013.01); *Y02T 10/7022* (2013.01); *Y02T 10/7066* (2013.01)

(56) References Cited

U.S. PATENT DOCUMENTS

| | | | |
|---|---|---|---|
| 7,193,391 B2* | 3/2007 | Moore | 320/116 |
| 7,573,151 B2* | 8/2009 | Acena et al. | 307/9.1 |
| 8,080,971 B2* | 12/2011 | Bose et al. | 320/101 |
| 8,120,290 B2* | 2/2012 | King | 318/139 |
| 8,486,571 B2* | 7/2013 | Choi et al. | 429/427 |
| 2004/0145186 A1 | 7/2004 | Inokuchi et al. | |
| 2005/0061561 A1* | 3/2005 | Leonardi et al. | 180/65.1 |
| 2005/0273225 A1* | 12/2005 | Brigham et al. | 701/22 |
| 2006/0033337 A1 | 2/2006 | Kojima et al. | |
| 2006/0046895 A1* | 3/2006 | Thacher et al. | 477/4 |
| 2010/0097031 A1* | 4/2010 | King et al. | 320/109 |

FOREIGN PATENT DOCUMENTS

| | | | |
|---|---|---|---|
| DE | 10059038 | | 5/2002 |
| JP | H0879908 | | 3/1996 |
| WO | 9745287 | | 12/1997 |
| WO | 2005/005187 | A1 | 1/2005 |
| WO | 2005005187 | | 1/2005 |

* cited by examiner

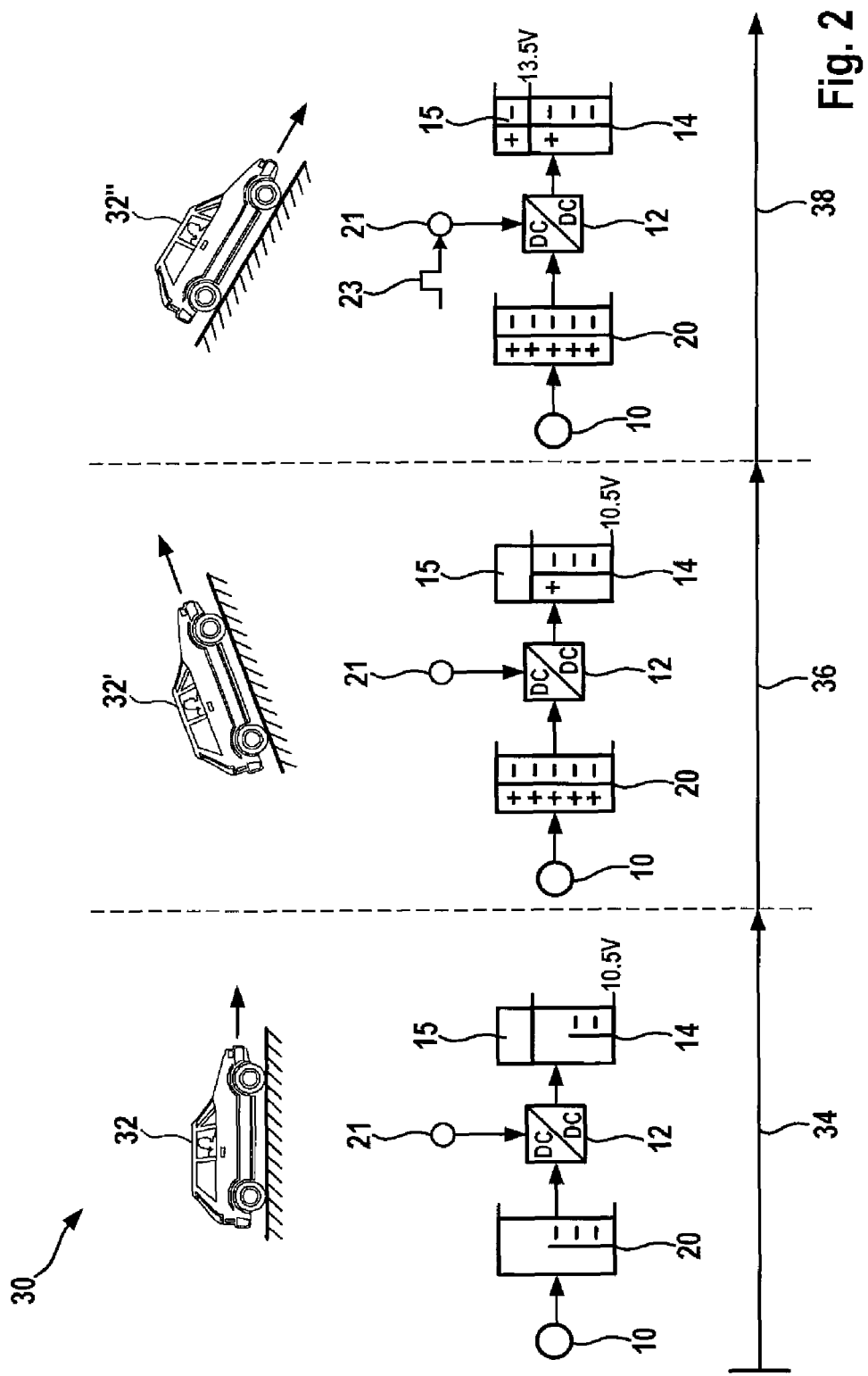

ONBOARD NETWORK FOR A VEHICLE AND METHOD FOR SAVING ENERGY

BACKGROUND OF THE INVENTION

The invention relates to an onboard network for a vehicle, in particular a motor vehicle. The onboard network has an electrical machine which is designed at least for generator operation. The onboard network also has a voltage converter which is connected at least indirectly to the electrical machine at the input end, and a first energy storage means, in particular a rechargeable battery, which is connected to the voltage converter at the output end.

DE 103 30 703 A1 by the same applicant discloses a multiple-voltage onboard network having a multiple-voltage generator/electric motor in which electrical energy can be generated during generator operation and can be fed to a component network for the purpose of supplying a load. The multiple-voltage onboard network also has a second component network, with a second load being connected to the second component network.

SUMMARY OF THE INVENTION

According to the invention, the electrical machine is designed for recuperative operation. The voltage converter is designed to detect or to limit a charge state of the first energy storage means and to regulate the charge state of the first energy storage means in such a way that the first energy storage means has a reserve capacity during generator operation, preferably when the vehicle is being driven such that it is consuming energy. The voltage converter is further designed to charge the reserve capacity of the first energy storage means as a function of a recuperation signal which is received at the input end and represents recuperative operation of the vehicle.

The first energy storage means is preferably a rechargeable battery, in particular a starter battery or battery of a drive for moving the vehicle.

Energy can advantageously be saved in a motor vehicle by virtue of the onboard network of the above-described type. Whereas conventional voltage converters, in particular charge regulators for charging a rechargeable battery, in particular a starter battery, of a motor vehicle charge the rechargeable battery until the rechargeable battery is fully charged and—in particular by means of limiting an output voltage—prevent the rechargeable battery from being excessively charged, in the case of the onboard network of the above-described type, a reserve capacity is advantageously retained in the rechargeable battery, it being possible for said reserve capacity to be charged only when the electrical energy which is generated by the electrical machine, in particular a generator or an electrical machine which is in the form of a drive motor and generator, is generated during recuperative operation—for example when the vehicle is being braked. The energy produced when the vehicle is being braked would otherwise—when the rechargeable battery is fully charged—be converted into lost heat by means of braking of the vehicle or of the drive motor. The energy which is stored in the reserve capacity can then advantageously be used to operate electrical loads or to start the vehicle. The onboard network of the above-described type can therefore—if employed as a standard part in a large number of vehicles—effectively contribute to improved environmental protection.

In an advantageous embodiment of the onboard network, the onboard network has a second energy storage means, in particular a capacitor, preferably a double-layer capacitor. The second energy storage means is connected to the electrical machine and is designed to store electrical charge which is generated by the electrical machine during generator operation and/or recuperative operation. In this embodiment, the voltage converter is designed to detect the charge state of the second energy storage means and to charge the reserve capacity as a function of the charge state of the second energy storage means, in particular of a voltage. As a result, the reserve capacity—in particular in an embodiment of the onboard network in the form of a multiple-voltage onboard network—can be charged when the second energy storage means, in particular the double-layer capacitor, is fully charged. The onboard network can further advantageously be designed to supply at least one electrical load of the vehicle with electrical energy selectively from the first energy storage means or from the second energy storage means. Therefore, electrical energy which is generated during recuperation can be made available to two loads which can in each case be operated with different operating voltages to one another. For example, the second energy storage means, in particular the double-layer capacitor, can therefore be charged with a voltage which is greater than the voltage of the first energy storage means. Therefore, the onboard network can further advantageously have two component networks with different onboard voltages to one another.

For example, the second energy storage means can have a capacity for an electrical charge of the kind that a vehicle can be started—for example an internal combustion engine of the vehicle can be started by means of a starter—or driven—for example an electric vehicle or hybrid vehicle with an additional electric motor—with the electrical energy which is held in reserve in the second energy storage means.

In a preferred embodiment, the voltage converter is designed to change a charge voltage, which is generated at the output end, for charging the first energy storage means as a function of the recuperation signal. The voltage converter can therefore advantageously generate the reserve capacity. The voltage converter is preferably designed to generate a charge voltage, which is increased in magnitude in comparison to generator operation, as a function of the recuperation signal, and to charge the reserve capacity with the increased charge voltage. By way of example, a voltage during generator operation—when, for example, the vehicle is accelerated or driven at a constant speed—is between 12 and 14 V. The increased charge voltage can then be, for example, more than 14 V, preferably between 14.5 and 15 V.

The second energy storage means is preferably a double-layer capacitor, a super capacitor or supercap. The first energy storage means is preferably a lead-acid rechargeable battery, in particular a lead-acid gel rechargeable battery. Further advantageous embodiments of the first energy storage means are a nickel-cadmium rechargeable battery, a nickel-metal hydride rechargeable battery, a sodium-sulfur rechargeable battery, a lithium-ion rechargeable battery or a lithium-polymer rechargeable battery.

The invention also relates to a voltage converter for a motor vehicle. The voltage converter has an output for connection of a rechargeable battery and an input for a supply voltage. The voltage converter is preferably designed to be connected to a supply voltage of a generator and/or of a capacitor, in particular a double-layer capacitor, at the input end. The voltage converter is designed to charge the rechargeable battery, by means of the supply voltage, in such a way that the rechargeable battery cannot be excessively charged. The voltage converter also has an input for a recuperation signal, with the voltage converter being designed to charge the rechargeable battery with a charge voltage and to generate a charge voltage, which is increased in magnitude in comparison to the charge voltage, as a function of a recuperation signal which is received at the input end, and to charge the rechargeable battery with the increased charge voltage. The voltage converter is further preferably designed to generate the increase charge voltage—independently of or in addition to the recuperation signal—as a function of a voltage which is received at the input end, in particular a voltage of a capacitor which is connected at the input end, in particular a twin capacitor. As a result, a reserve capacity of the rechargeable battery, which reserve capacity can be charged as a function of the recuperation signal, can advantageously be formed.

The invention also relates to a method for operating an onboard network, preferably a multiple-voltage onboard network of a vehicle, in particular a motor vehicle. In said method, a charge state of a first energy storage means is detected and/or limited. The charge state of the first energy storage means is also regulated in such a way that the first energy storage means has a reserve capacity during generator operation, in particular when the vehicle is being driven, and the reserve capacity of the first energy storage means is charged as a function of recuperative operation of the vehicle. Further preferably, a charge state, in particular a voltage, of a second energy storage means is detected, and the reserve capacity is charged as a function of the charge state of the second energy storage means. In the method, the reserve capacity is further preferably charged when the second energy storage means is fully charged. As a result, recuperation energy can advantageously be held in reserve with preference in the second energy storage means. The reserve capacity of the first energy storage means is used when the second energy storage means is fully charged. The second energy storage means can preferably be charged more quickly, in particular with a higher current, than the first energy storage means. As a result, the recuperation energy can advantageously be stored more quickly and more efficiently.

BRIEF DESCRIPTION OF THE DRAWINGS

The invention will now be described below with reference to figures and further exemplary embodiments.

FIG. 2 schematically shows an exemplary embodiment of a method for operating a multiple-voltage onboard network of a motor vehicle, in which method energy can advantageously be saved.

DETAILED DESCRIPTION

Figure 1:
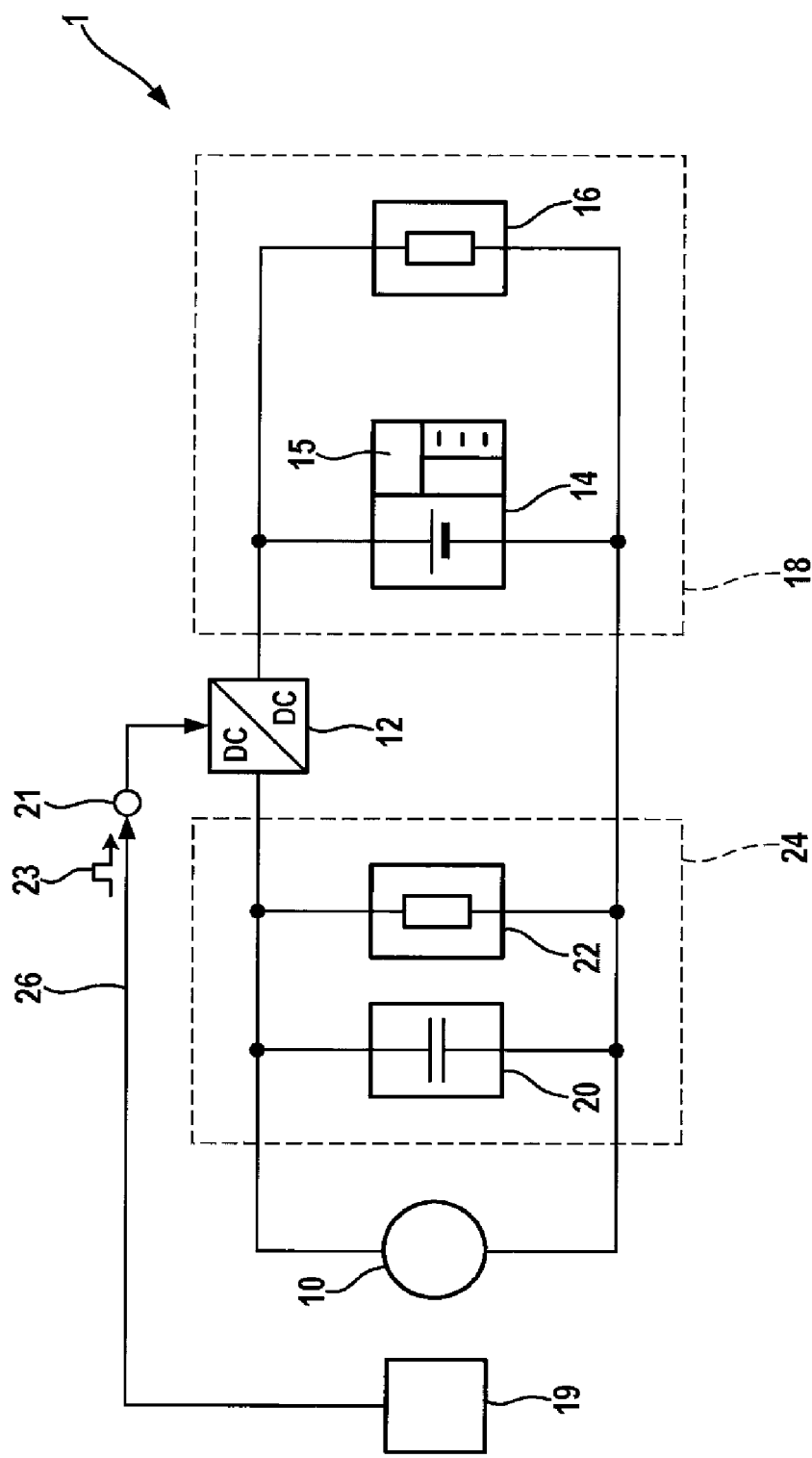
FIG. 1 schematically shows an exemplary embodiment of an onboard network for a motor vehicle, which is designed in the form of a multiple-voltage onboard network.

FIG. 1—schematically—shows an exemplary embodiment of an onboard network 1 of a vehicle, in particular a motor vehicle, transportation vehicle or forklift truck. The onboard network 1 has two component networks, specifically a component network 18 and a component network 24. The onboard network 1 also has a voltage converter 12. The voltage converter 12 is connected to the component network 24 at the input end. The component network 24 has an energy storage means 20 which is in the form of a double-layer capacitor in this exemplary embodiment. The component network 24 also has a load resistor 22 which can be formed, for example, by at least one, preferably a plurality of, electrical loads of the motor vehicle.

The voltage converter 12 is also connected to the generator 10 at the input end. In this exemplary embodiment, the generator 10 is designed to generate electrical energy as a function of a rotary movement of a motor of the vehicle 1 and to feed said electrical energy to the component network 24 at the output end.

The voltage converter 12 is connected to a component network 18 at the output end. The component network 18 has a rechargeable battery 14 and a load resistor 16. The load resistor 16 is formed, for example, by at least one electrical load, preferably a large number of electrical loads of the motor vehicle. The voltage converter 12 is designed to receive a DC voltage which is received at the input end, for example a DC voltage with which the component network 24 is operated, of between 14 and 42 V for example, and to generate an output voltage which differs from the voltage which is received at the input end. In this exemplary embodiment, the voltage converter 12 is designed to generate the output voltage as a function of the voltage which is received at the input end. In this exemplary embodiment, the voltage which is received at the input end reflects a charge state of the second energy storage means 20. In this exemplary embodiment, the voltage converter 12 is designed to generate an output voltage which is lower than the voltage which is received at the input end. In this exemplary embodiment, the voltage converter 12 is also designed to regulate a charge state of the first energy storage means 14 in such a way that the first energy storage means has a reserve capacity during generator operation of the generator 10, in particular when the vehicle is being driven such that it is consuming energy.

The voltage converter 12 also has an input 21 for a recuperation signal 23. The voltage converter 12 is connected, by way of the input 21, to a control unit 19 of the onboard network 1 via a connection line 26. The control unit 19 is designed to generate a recuperation signal 23 in the event of recuperative operation of the vehicle and to output this recuperation signal at the output end via the connection line 26.

The voltage converter 12 is designed to fill the reserve capacity 15, which was previously generated, of the rechargeable battery 14 with electrical charge as a function of the recuperation signal 23 which is received at the input end. The voltage converter 12 is designed to increase the voltage which is generated at the output end as a function of the recuperation signal 23 which is received at the input end—in comparison to a voltage which is generated during energy-consuming operation of the vehicle.

The rechargeable battery 14 is then charged with the increased voltage, for example with 14.8 volts instead of 14 volts, and therefore the reserve capacity 15 can be filled. By way of example, the rechargeable battery, in particular the lead-acid rechargeable battery, comprises 6 electrochemical cells. In another embodiment, the rechargeable battery comprises 12 electrochemical cells. The rechargeable battery can then be charged with an increased voltage of 29.2 volts instead of 28 volts.

FIG. 2 shows an exemplary embodiment of a method 30 for operating an onboard network of a motor vehicle, for example the onboard network 1 already illustrated in FIG. 1. In method step 34 of method 30, electrical energy which is generated by a generator 10—for example the generator 10 which is illustrated in FIG. 1—of a vehicle 32 is temporarily stored by means of a second energy storage means 20 of the vehicle 32, for example of a double-layer capacitor, and is made available by the second energy storage means 20 for the purpose of operating a component network of the vehicle 32 which has a supply voltage of between 14 and 42 V for example. In this method step, the second energy storage means 20 is still not fully charged. The second energy storage means 20 is connected to the voltage converter 12 which is already illustrated in FIG. 1.

The voltage converter 12 is connected to a first energy storage means 14 at the output end. The first energy storage means 14 is, for example, a rechargeable battery, in particular a lead-acid rechargeable battery of the motor vehicle 32, with the lead-acid rechargeable battery comprising 6 electrochemical cells. The voltage converter 12 is designed to only partially charge the first energy storage means 14 with a predetermined voltage, for example of between 13.5 volts and 14 volts, in the event of energy-consuming operation of the vehicle 32, and therefore the first energy storage means 14 has a reserve capacity 15. The first energy storage means is illustrated in the form of a lead-acid rechargeable battery which is discharged at 10.5 volts and of which the reserve capacity begins at the voltage of 13.5 volts.

The method 30 also exhibits a method step 36. In method step 36, the vehicle, illustrated as vehicle 32' in this method step, is being driven, for example, uphill and consumes energy, for example gasoline, diesel, gas or hydrogen, in the process. During this energy-consuming operation, the generator 10 continues to charge the second energy storage means 20 until the second energy storage means 20 is fully charged and, in the fully charged state, has a predetermined charge voltage, for example of 42 volts.

The method 30 also exhibits a method step 38. In method step 38, the vehicle 32—illustrated as vehicle 32" in this method step—is being driven downhill and recuperation energy can be generated by means of the generator 10 as the vehicle is being driven downhill. In this exemplary embodiment, the second energy storage means 20 is already fully charged and can no longer hold any further electrical energy. The voltage converter 12 can now charge the reserve storage means 15 as a function of a recuperation signal 23 which is received at the input 21 at the input end, and therefore the recuperation energy can be stored in the reserve storage means 15. To this end, the voltage converter 12 can generate a voltage of 14.8 V, for example, at the output end.

The recuperation energy which is stored in the reserve storage means 15 can now be further used to operate electrical loads of the vehicle 32.

In contrast to the manner illustrated in method step 36, the second energy storage means 20 can be charged during recuperation operation. In addition to the voltage converter 12 already illustrated, the onboard network of the vehicle 32 can have a further voltage converter which is arranged between the second energy storage means and the generator 10. The second voltage converter can be designed to keep ready a further reserve capacity, for example by means of changing a charge voltage, in the second energy storage means, and to charge the further reserve capacity as a function of the recuperation signal 23.

Energy can advantageously be saved by means of the voltage converter 12 designed in this way, and therefore the impact on the environment can be advantageously lessened in this way—in particular by reduced production of greenhouse gases.

The invention claimed is:

1. An onboard network for a vehicle, including
an electrical machine, wherein the electrical machine is configured at least for generator operation and recuperative operation;
a voltage converter, wherein the voltage converter is connected at least indirectly to the electrical machine at an input end of the voltage converter;
a first energy storage means, wherein the first energy storage means is connected to the voltage converter at an output end of the voltage converter; and
a second energy storage means, wherein the second energy storage means is connected to the voltage converter at the input end of the voltage converter,
wherein the voltage converter is configured to
generate a first charge voltage at the output end, wherein the first charge voltage is less than a supply voltage received at the input end,
detect a charge state of the first energy storage means,
detect a charge state of the second energy storage means,
regulate the charge state of the first energy storage means in such a way that the first energy storage means has a reserve capacity throughout generator operation, wherein the reserve capacity is a range of charge states of the first energy storage means between fully charged and a predetermined threshold beyond which the first energy storage means is only charged during recuperative operation, and
charge the reserve capacity as a function of
a recuperation signal which is received at the input end, and
the charge state of the second energy storage means.

2. The onboard network of claim 1, wherein the second energy storage means is configured to store an electrical charge which is generated by the electrical machine throughout generator operation and recuperative operation.

3. The onboard network of claim 1, wherein the voltage converter is further configured charge the first energy storage means with the first charge voltage.

4. The onboard network of claim 3, wherein the voltage converter is furthered configured
to generate a second charge voltage, wherein the second charge voltage is increased in magnitude in comparison to the first charge voltage as a function of the recuperation signal, and
to charge the reserve capacity with the second charge voltage.

5. A voltage converter for a motor vehicle, the voltage converter including:
an output connection for a first energy storage means;
a first input connection for a supply voltage; and
a second input connection for a recuperation signal,
wherein the voltage converter is configured to
generate a first charge voltage, wherein the first charge voltage is less than the supply voltage,
charge the first energy storage means with the first charge voltage,
generate a second charge voltage, wherein the second charge voltage is increased in magnitude in comparison to the first charge voltage as a function of the recuperation signal, and
charge the first energy storage means with the second charge voltage, in such a way that the first energy storage means has a reserve capacity, and
charge the reserve capacity as a function of the recuperation signal, and the charge state of the second energy storage means,
wherein the reserve capacity is a range of charge states of the first energy storage means between fully charged and a predetermined threshold beyond which the first energy storage means is only charged during a recuperative operation of the vehicle.

6. A method for operating a multiple-voltage onboard network of a vehicle, the method comprising:

detecting, by a voltage converter, a charge state of a first energy storage means, wherein the first energy storage means is connected to the voltage converter at an output end;

detecting, by a voltage converter, a charge state of a second energy storage means, wherein the second energy storage means is connected to the voltage converter at an input end;

generating, by the voltage converter, a charge voltage, wherein the charge voltage is lower than a supply voltage received by the voltage converter at the input end;

regulating, by the voltage converter, the charge state of the first energy storage means in such a way that the first energy storage means has a reserve capacity throughout generator operation of an electric machine, wherein the reserve capacity is a range of charge states of the first energy storage means between fully charged and a predetermined threshold beyond which the first energy storage means is only charged during a recuperative operation of the vehicle; and charging, by the voltage converter, the reserve capacity as a function of
 a recuperation signal, and
 the charge state of the second energy storage means.

7. The method of claim 6, wherein the reserve capacity is charged when the second energy storage means is fully charged.

\* \* \* \* \*